(12) United States Patent
Li et al.

(10) Patent No.: US 8,332,817 B2
(45) Date of Patent: Dec. 11, 2012

(54) CERTIFYING A SOFTWARE APPLICATION BASED ON IDENTIFYING INTERFACE USAGE

(75) Inventors: Richard Ding Li, Somerville, MA (US); David S. Miller, San Francisco, CA (US)

(73) Assignee: Red Hat, Inc., Raleigh, NC (US)

( * ) Notice: Subject to any disclaimer, the term of this patent is extended or adjusted under 35 U.S.C. 154(b) by 1286 days.

(21) Appl. No.: 11/268,487

(22) Filed: Nov. 8, 2005

(65) Prior Publication Data
US 2007/0168957 A1 Jul. 19, 2007

(51) Int. Cl.
G06F 9/44 (2006.01)

(52) U.S. Cl. ........ 717/124; 717/122; 717/126; 717/127; 717/128; 717/129

(58) Field of Classification Search ......... 379/9.01; 717/124, 127–129
See application file for complete search history.

(56) References Cited

U.S. PATENT DOCUMENTS

| | | | | |
|---|---|---|---|---|
| 5,490,249 | A * | 2/1996 | Miller | 714/38 |
| 5,652,835 | A * | 7/1997 | Miller | 714/38 |
| 6,862,696 | B1 * | 3/2005 | Voas et al. | 714/38 |
| 7,003,560 | B1 * | 2/2006 | Mullen et al. | 709/223 |
| 7,150,008 | B2 * | 12/2006 | Cwalina et al. | 717/126 |
| 7,209,970 | B1 * | 4/2007 | Everson et al. | 709/229 |
| 7,225,462 | B2 * | 5/2007 | Bass et al. | 726/6 |
| 7,278,059 | B2 * | 10/2007 | Hughes | 714/38 |
| 2004/0015870 | A1 * | 1/2004 | Arbouzov et al. | 717/126 |
| 2004/0054946 | A1 * | 3/2004 | Atallah et al. | 714/38 |
| 2004/0054988 | A1 * | 3/2004 | Atallah et al. | 717/122 |
| 2005/0065932 | A1 * | 3/2005 | Rocha | 707/9 |
| 2005/0125778 | A1 * | 6/2005 | Fleegal | 717/136 |
| 2005/0193266 | A1 * | 9/2005 | Subramanian et al. | 714/38 |
| 2010/0138908 | A1 * | 6/2010 | Vennelakanti et al. | 726/11 |

OTHER PUBLICATIONS

Author: Subbarao; Title: "The Technology Behind LynxOS v4.0's Linux ABI Compatibility"; Date: Jun. 4, 2002; URL: http://www.lynuxworks.com/products/whitepapers/compatibility.php3.*

Author: Sun Microsystems; Title: "A Practical Guide to Adopting the Solaris 8 OS: Part 3"; Date: Jul. 2000; URL: http://developers.sun.com/solaris/articles/solaris8/solaris8_wp3.html.*

Author: Chu; Title: "appcert: A Static Application Checking Tool"; Date: Jun. 2001; URL: http://developers.sun.com/solaris/articles/appcert.html.*

Author: Suffield; Title: "man icheck (1)—C interface ABI/API checker"; Date: undated; URL: http://www.digipedia.pl/man/doc/view/icheck.1.html.*

(Continued)

*Primary Examiner* — Insun Kang
(74) *Attorney, Agent, or Firm* — Lowenstein Sandler PC (57) ABSTRACT

Embodiments of the present invention provide a mechanism for certifying the compatibility of a software product by identifying the interfaces (API or ABI) used by that product. The source code or object code of a component is analyzed by a tool that traces which interfaces and data structures of an ABI/API are being utilized. For example, an ISV or IHV may be required to run the tool on their respective components in order to have that component certified with a particular version of an operating system and submit the results to a certification service. The certification service may collect this API/ABI information into an integrated database. The certification service may then use this database to analyze the impact of changes to an operating system at the binary interface level, proactively notify vendors prior to these changes, test compatibility and emulation libraries, and certify components are compatible with an operating system without the need of significant testing.

16 Claims, 5 Drawing Sheets

OTHER PUBLICATIONS

Author: Debian Project; Title: "Debian Changelog icheck (0.9.7-6.1)"; Earliest Date: Mar. 20, 2005; URL: http://packages.debian.org/changelogs/pool/main/i/check/icheck_0.9.7-6.1/changelog.*

Author: Cheng; Title: "Technical guide for porting applications from Solaris to Linux, Version 1.0"; Date: Feb. 12, 2002; URL: http://www.ibm.com/developerworks/eserver/articles/porting_linux/.*

Author: Sun; Title: Solaris ABI Tools; Date: Dec. 25, 2004; URL: http://web.archive.org/web/20041225005330/http://www.sun.com/software/solaris/programs/abi/.*

Author: Jones; Title: "Deducing an Applications use of API's"; Date: Feb. 18, 1997; URL: http://www.knosof.co.uk/apichk.html.*

* cited by examiner

CERTIFYING A SOFTWARE APPLICATION BASED ON IDENTIFYING INTERFACE USAGE

FIELD OF THE INVENTION

The present invention relates generally to the certification of software.

BACKGROUND OF THE INVENTION

In the computer industry, customers would like to know which components of hardware, firmware, software, etc. will work well together. Accordingly, most vendors test and certify the compatibility of their products. For example, independent software vendors (ISVs) and independent hardware vendors (IHVs) will certify which of their specific products are compatible with a particular version of an operating system or version of software. Typically, the certification process involves running a suite of tests on one or more computer systems that include the product to be certified.

Unfortunately, the variety of configuration options of computing equipment and software has increased tremendously. There is now a wide range of options in processors, chipsets, peripherals, storage devices, device drivers available for use in computer systems. This results in a virtually endless range of possible configurations for computer systems and its software. In addition, the available options for computer systems are constantly changing as products are updated or as new products are released. Thus, most vendors can only test their products in a limited number of configurations, which do not account for all of the available options. This increases the risk that a product will not work in a particular system, even though it has been certified.

For example, as operating systems are updated, the libraries and interfaces to the operating system may change. This ultimately affects the compatibility of application programs that rely on the operating system. Typically, developers have had to conduct extensive testing and adjust their application programs after the fact. This can be a difficult and time consuming task.

Accordingly, it may be desirable to provide methods and systems for efficiently testing and certifying the compatibility of products.

SUMMARY OF THE INVENTION

In accordance with one feature of the invention, a method of certifying a compatibility between software components is provided. A set of interfaces used by a first software component to operate with a second software component is detected. It is then determined whether changes to the second software component affects the set of interfaces used by the first software component. The first software component can be certified it is compatible with the second software component based on whether changes to the second software component affects the set of interfaces used by the first software component.

In accordance with another feature of the invention, a method of certifying compatibility of a software component is provided. A first version of an operating system is identified that the software component has been certified. A set of interfaces between the first operating system and the software component is detected. It is then determined whether there are changes to the set of interfaces from the first version of the operating system to a second version of the operating system. Effects of the changes to the set of interfaces to the software component are determined. The software component can then be certified with the second version of the operating system based on the effects of the changes.

In accordance with another feature of the invention, a method of indicating an impact to changes to a base software component on at least one additional software component is provided. Interfaces used by the at least one additional software component to operate with the base software component are gathered. Changes between versions of the base software component are determined. Effects of the changes on the gathered interfaces used by the at least one additional software component are also determined. Information is then provided that indicates which packages include the base software component and the at least one additional software component affected by the changes on the gathered interfaces and information that indicates how at least one additional software component was affected.

In accordance with another feature of the invention, a system configured to collect information about interfaces used by a first software component to operate with a second software component is provided. The system may comprise a scanner, a comparator, and an emitter. The scanner is configured to detect a set of interfaces used by the first software component to operate with a second software component. The comparator is configured to determine whether changes to the second software component affects the set of interfaces used by the first software component. The emitter is configured to provide information about the detected set of interfaces and an impact of changes to the second software component.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Virtually all computer systems rely on some form of an operating system, such as UNIX, Linux, Microsoft Windows, etc. An operating system is an integrated collection of routines that service the sequencing and processing of programs and applications run by a computer system. In general, an operating system provides various services for accessing the components of the computer, such as resource allocation, scheduling, input/output control, and data management.

Application programs run on top of the operating system and utilize what are known as an application programming interface (API) and an application binary interface (ABI) in order to interface the operating system. An API defines the interface between an application program's source code and the operating system's libraries. API compatibility relates to when the same source code will compile on any computer system having the same API.

An ABI of an operating system describes the low-level interface between an application program and the operating system, between the application program and its libraries, or between component parts of an application and the operating system. ABIs relate to details such as calling conventions, system call numbers, the binary format of object files, program libraries, etc. ABI compatibility (or binary compatibility) relates to when compiled object code can function without any changes on any computer system having an operating system with the same ABI.

When an operating system or one of its components is updated, either the API or ABI may be affected. This in turn may affect the functionality of an application program or other component that relies on the operating system. Some embodiments of the present invention provide a mechanism for certifying the compatibility of a software product by identifying the interfaces (API or ABI) used by that product.

The source code or object code of a component is analyzed by a tool that traces which interfaces and data structures of an ABI/API are being utilized. For example, an ISV or IHV may be required to run the tool on their respective components in order to have that component certified with a particular version of an operating system and submit the results to a certification service. The certification service may collect this API/ABI information into an integrated database. The certification service may then use this database to analyze the impact of changes to an operating system at the binary interface level, proactively notify vendors prior to these changes, test compatibility and emulation libraries, and certify components are compatible with an operating system without the need of significant testing.

Reference will now be made in detail to embodiments of the invention, examples of which are illustrated in the accompanying drawings. For purposes of explanation, FIGS. 1-5 are described with reference to certifying the compatibility of a component from a vendor with one or more sets of installed program code. The component may be any form of hardware, software, firmware, or the like. The installed program code may generally refer to various types of software, such as the operating system, device drivers, and the like that are installed on a system. For example, the program code may be a particular operating system kernel (such as a LINUX kernel), BIOS, device driver, libraries, and the like. However, one skilled in the art will recognize that the certification processes of the present invention may be applied to confirm the compatibility of any combination of hardware or software that is desired.

Figure 1:
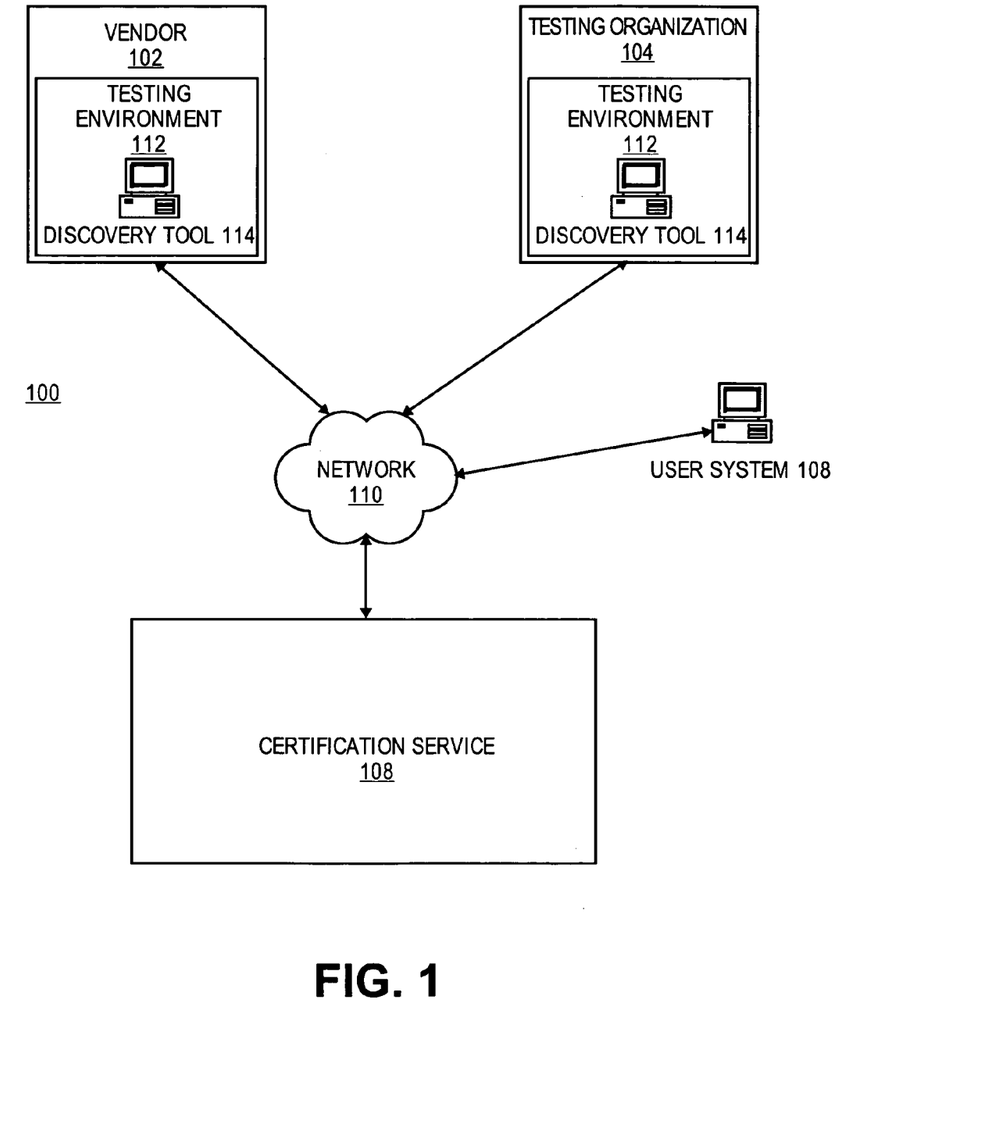
FIG. 1 illustrates an exemplary system having dependent software components.
Figure 2:
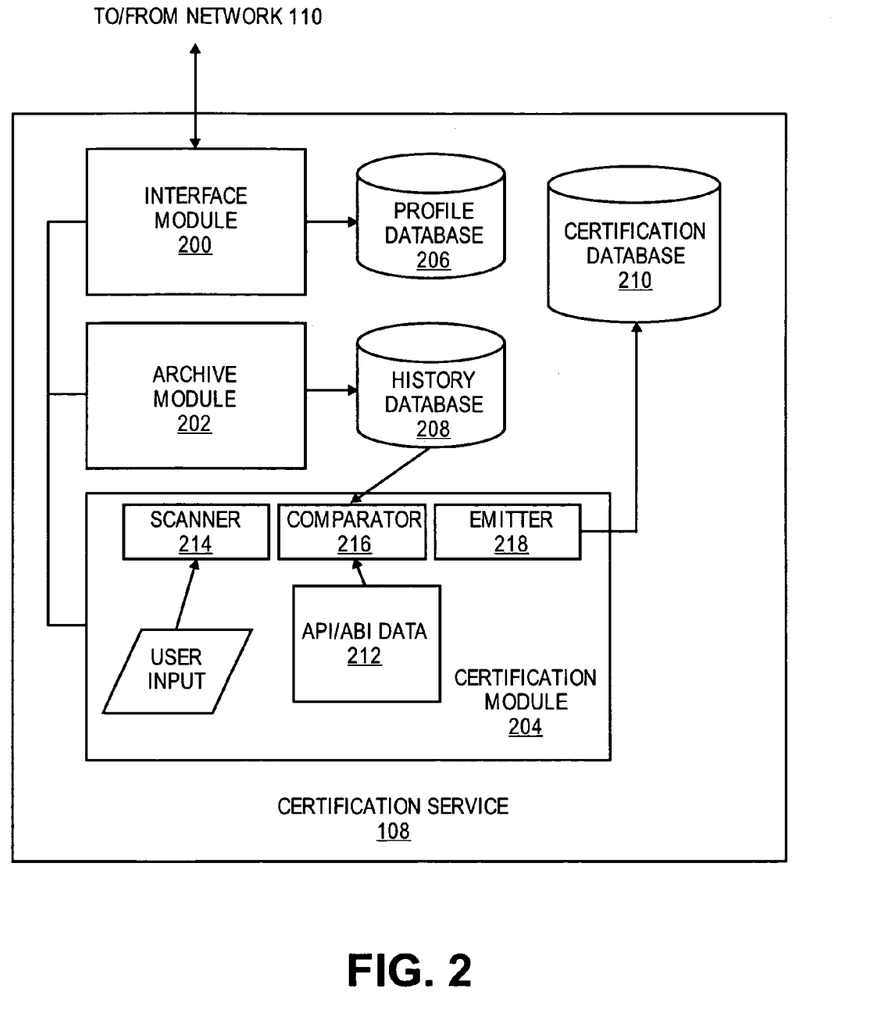
FIG. 2 illustrates an architecture for an exemplary certification service that is in accordance with embodiments of the present invention.
Figure 3:
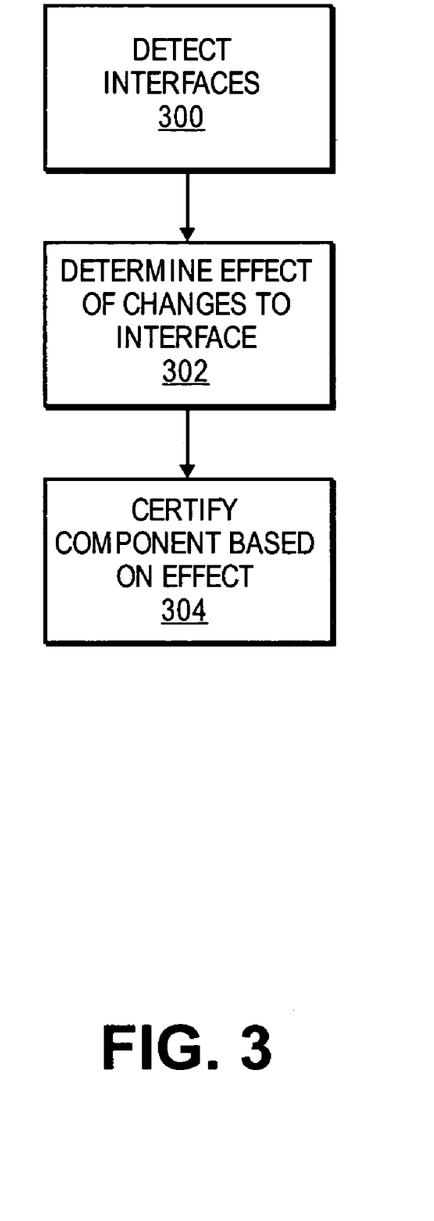
FIG. 3 illustrates a general process flow for certifying a component in accordance with embodiments of the present invention.

FIGS. 1-2 illustrate generally the systems that may be used to certify components in accordance with the principles of the present invention. Specifically, FIG. 1 shows an exemplary system for certifying components and program code. FIG. 2 shows an exemplary architecture for a certification service that may be part of the system shown in FIG. 1. FIG. 3 illustrates a certification process that is consistent with the principles of the present invention. Wherever possible, the same reference numbers will be used throughout the drawings to refer to the same or like parts.

FIG. 1 shows an embodiment of a system 100 for certifying components in accordance with the principles of the present invention. As shown, system 100 may include a vendor 102, a testing organization 104, a user system 106, and a certification service 108. Although FIG. 1 depicts a single vendor, testing organization, and user system, embodiments of the present invention may accommodate any number of such entities.

The entities of system 100 may communicate with each other in a variety of ways. For example, as shown in FIG. 1, the entities of system 100 may be coupled through a network 110. Network 110 may be implemented using the Internet, or other network.

Alternatively, the entities of system 100 may communicate with each other indirectly. For example, vendor 102 and testing organization 104 may provide to and receive its information from certification service 108 in the form of a computer readable medium, such as a compact disc.

The specific entities of system 100 will now be further described. Vendor 102 may be any provider of hardware or software, such as an ISV or IHV. Vendor 102 may also provide various other services related to its products, such as update information, technical support, and the like. Vendor 102 may provide these products and services directly or indirectly.

In some embodiments, vendor 102 may implement a testing environment 112 to perform certification testing for its components. In particular, vendor 102 may implement testing environment 112 to test one or more of its components using an interface discovery tool 114. Although FIG. 1 shows vendor 102 with a single testing environment 112 and interface discovery tool 114, one skilled in the art will recognize that vendor 102 may operate any number of these systems. Exemplary implementations of testing environment 112 and interface discovery tool 114 will now be further described.

Testing environment 112 may comprise one or more servers and testing software, such as interface discovery tool 114. Such equipment and software are well known to those skilled in the art. For example, this equipment controls and monitors the testing of an application program by interface discovery tool 114. In addition, the equipment of testing environment 112 may report the results of any testing back to certification service 108. In some embodiments, the servers of testing environment 112 may run interface discovery tool 114, which is provided by certification service 108.

Interface discovery tool 114 provides a tool for checking an application program's usage of an operating system's interfaces. Interface discovery tool 114 may test a component or application program based on source code or object code. As noted above, when testing source code, interface discovery tool 114 provides information about the API usage of the software component. When testing object code, interface discovery tool 114 provides information about the ABI usage of a software component. In some embodiments, interface discovery tool 114 may be primarily configured to determine ABI usage since most components or application programs are shipped in the form of object code. However, interface discovery tool 114 may analyze either type of interface.

Interface discovery tool 114 may be based on tools that are known to those skilled in the art. For example, tools, such as "Appcert", "Apptrace" from Sun Microsystems Inc., and "ABIcheck" for Linux operating systems, are known tools that check and output the ABI usage of a software component. Interface discovery tool 114 may output a complete list of the interfaces in a flat file, a formatted table, or some other data structure.

Interface discovery tool 114 may be implemented to examine various object code files that are associated with an operating system. For example, executable and linkable format (ELF) is a common standard used in many operating systems. Interface discovery tool 114 may also be configured to focus on tracing the usage of shared libraries and various symbols.

Vendor 102 may also have its testing performed by another entity, such as testing organization 104. For example, testing organization 104 may be an organization that specializes in testing certification or development purposes. These organizations are well known to those skilled in the art.

In some embodiments, testing organization 104 may be sponsored or authorized by the same organization that operates certification service 108. As shown, testing organization 104 may also implement its own testing environment 112 and use interface discovery tool 114 in the same manner described above. Of course, one skilled in the art will also recognize that vendor 102 and testing organization 104 may conduct testing alone or in combination with each other.

In addition to the testing performed by vendor 102 and testing organization 104, system 100 may collect and consider information from live systems that are in use, such as user system 106. User system 106 may be any known type of computer or computer system that implements either the component or the program code that was certified. In some embodiments, user system 106 may be any device having the Linux operating system installed as well as various components from ISVs and IHVs. Such systems are well known to those skilled in the art.

In some embodiments, user system 106 may also run interface discovery tool 114 on one or more of its application programs and provide ABI data to certification service 108. For example, user system 106 may transmit its interface data over network 110 to certification service 108 or back to vendor 102. In some embodiments, user system 106 may use well known techniques, such as encryption and digital signatures to secure the transmission of this information over network 110.

User system 106 may transmit this data over network 110 in raw or processed form. For example, user system 106 may use a well known data exchange protocol, such extensible markup language ("XML"). User system 106 may also be configured to transmit its operational data at various times. For example, user system 106 may send operational data upon an abnormal termination, or on a periodic basis. As noted, user system 106 may secure the transmission of this information over network 110 using well known techniques, such as secure sockets layer ("SSL").

Certification service 108 provides an infrastructure and business logic for certifying components. In some embodiments, certification service 108 is implemented as a website or part of a website on the Internet. Accordingly, certification service 108 may include any number of conventional servers (not shown). Such servers may be implemented with an Intel-based processor that executes an operating system, such as the Linux operating system. Furthermore, the servers of certification service 108 may support the TCP/IP communication for connecting to the other components of system 100, such as vendor 102, testing organization 104, or user system 106, over the Internet.

Of course, one skilled in the art will recognize that certification service 108 may include any amount of sufficient hardware to support a relatively large amount of certification information, such as testing results and operational data, and other operations. One example of an architecture for certification service 108 is shown with reference to FIG. 2.

Network 110 provides a communication infrastructure for system 100. Network 110 may be implemented based on known topologies and components. For example, network 110 may be implemented based on one or more local area networks, such as an Ethernet network, a wide area network, the Internet, or the like.

FIG. 2 shows an exemplary architecture for certification service 108 that is consistent with the principles of the present invention. In accordance with the present invention, the certification service 108 includes a number of executable components and database structures useful for certification. As shown, certification service 108 may include an interface module 200, an inventory module 202, and a certification module 204. These components may be implemented based on known components of hardware and software. For example, these components may be implemented as applications running on one or more conventional servers. In some embodiments, the servers of certification service 108 run applications and the Linux operating system. The functions of these exemplary components of certification service 108 will now be described.

Interface module 200 manages communications between certification service 108 and the other entities of system 100, such as vendor 102 and testing organization 104. For example, interface module 200 may be configured to periodically poll vendor 102 and testing organization 104 on a regular basis to request API or ABI data for various components and application programs.

The configuration information from vendor 102 or testing organization 104 may include a wide variety of data and may be in any format. For example, information from vendor 102 may be in the form of an XML file or a network location, such as a URL on the Internet. Alternatively, interface module 200 may be configured to obtain information from vendor 102 or testing organization 104 by searching the Internet to identify who has released testing results or operational data recently. Software vendor interface module 200 may then download this information into history database 208, or store one or more network locations (URL) where the download can be obtained.

In addition, interface module 200 may provide one or more pages for authenticating the identity of vendor 102, testing organization 104, or user system 106, such as a user ID, password, digital certificates, and the like. This information may be manually entered by a user, or may automatically provided once a connection is established. Interface module 200 may be configured to collect other information, such as contact information, a mailing address, an email address, and payment information. Of course, interface module 200 may also provide instructions and a process for registering a new entity or enterprise that wishes to participate with certification service 108. In some embodiments, this information may be stored in and retrieved from profile database 206.

Archive module 202 gathers the API and ABI data from vendor 102, testing organization 104, and user system 106. Archive module 202 may then build history database 208 to catalog the usage of various API and ABI interfaces by different operating systems, components, and application programs.

Certification module 204 provides logic for determining whether a particular component or application program can be certified when a change to an API or ABI has occurred. For example, if a change to an ABI by a new operating system version does not affect a component or application program, then those components or applications programs may again be certified. As another example, certification module 204 may identify the components and application programs that are affected by a change to a particular ABI interface. Accordingly, certification module 204 may issue a notice or message to the vendors of these components and application programs.

In this way, the vendors and certification service 108 can avoid significant testing because the specific changes that affect compatibility have already been identified. Of course, one skilled in the art will recognize that other rules or criteria may be used to certify components.

As shown, certification module 204 may comprise a scanner 214, a comparator 216, and an emitter 218. Generally, certification module 204 may accept user input 220, for example, via interface module 200. User input 220 may comprise a proposed change to an operating system. The components of certification module 204 will now be briefly described to explain how the proposed changed may be analyzed. One skilled in the art will recognize that the components of certification module 204 may be implemented using well known modules of software.

Scanner 214 receives user input 220 and resolves the bindings and symbols that are used by the proposed change. Scanner 214 may utilize a standard runtime linker to resolve any dependencies and identify the paths to shared objects that would be loaded. For example, scanner 214 will scan for the usage of symbols and links to shared objects. In some embodiments, scanner 214 may alert when private symbols or static links are found, since this type of interface usage is prone to instability during changes. Therefore, scanner 214 determines an interface profile or footprint for the proposed change.

Comparator 216 takes the interface profile of the proposed change and compares it to the API or ABI usage of current components or application programs. In particular, comparator 216 may search history database 208 and identify which interfaces of an API or ABI are utilized by various components that have been certified. For example, comparator 216 may retrieve one or more previous specifications for an API or ABI from API/ABI data 212. Comparator 216 may thus compare one or more versions of an operating system and how they impact usage of the API or ABI.

Emitter 218 provides a report that indicates the impact of the proposed change. For example, emitter 218 may output a report or table that indicates each interface affected by the proposed change and the components or application programs that depend on the affected interface. Emitter 218 may retrieve this information from certification database 210. Emitter 218 may also be configured to transmit one or more portions of its output to the vendors, such as vendor 102, of the affected components or application program.

As noted, certification service 108 may include a profile database 206, a history database 208, and certification database 210. These databases may be implemented based on any known schema, for example, as a relational or object oriented database. Of course, one skilled in the art will recognize that certification service 108 may include or be coupled to other databases, such as a database that maintains information about the products from vendor 102, or information about user system 106. The exemplary databases shown in FIG. 2 will now be described.

Profile database 206 includes information related to authenticating a user or entity, such as vendor 102 or testing organization 104, and determining their respective rights to the configuration information gathered by certification service 108. For example, vendor 102 or testing organization 104 may be give access rights to their previous testing results and to the testing results of other entities under certain circumstances.

Other information that may be included in profile database 206 may comprise group and individual permissions of users belonging to vendor 102 or testing organization 104, authorized partners of these entities, and contact information. In addition, profile database 206 may include information that indicates a profile of support that has been offered or promised to a user. For example, a user's profile of support may relate to a service level agreement, organizations that have agreed to provide support to that user, contact information of support personnel, and the like.

History database 208 stores the information gathered from the entities of system 100. For example, history database 208 may store the raw test result information generated by interface discovery tool 114 when run by vendor 102, testing organization 104, or user system 106. Typical information the may be included in history database 208 may relate to a product description of the component or application program tested by interface discovery tool 114, driver files, information about the host bus adapter of interface discovery tool 114, and information that identifies the respective vendors of hardware and software.

Certification database 210 provides a catalog of components that are currently certified. For example, certification database 210 may provide information that indicates which components of hardware have been tested and certified with various sets of program code, such as operating system kernels, device drivers, BIOS, and the like.

One skilled in the art will recognize that certification database 210 may be configured to provide its information in a variety of formats. For example, certification database 210 may be configured to provide certification information that is sorted by vendor name, component name, component type, hardware platform type, central processing unit type, peripheral type, software platform type, software application, operating system version, BIOS version, date, and the like.

ABI/API data 212 comprises the various API and ABI specifications for a number of operating systems. For example, ABI/API data 212 may include various ABIs that conform to Intel's Binary Compatibility Standard (iBCS). Of course, other API and ABI specifications may be included in ABI/API data 212 as well.

Various processes for certifying components will now be described with reference to FIGS. 3-5. Referring now to FIG. 3, a flowchart is shown in which the compatibility of a component and program code are certified based on information about configurations of a plurality of computer systems. In stage 300, the interface usage of a component or application program is detected. For example, interface discovery tool 114 may be run by a vendor 102, testing organizations 104, etc. on the component. In some embodiments, the ABI usage of a component is traced by interface discovery tool 114 and provided to certification service 108. Archive module 202 may then compile this information into history database 208. Processing may then flow to stage 302.

In stage 302, certification service 108 determines the effect of a proposed change. In particular, certification module 204 may receive a proposed change to an operating system via user input. The proposed change may be separately identified and submitted in its own file. Alternatively, certification module 204 may receive a new version of an operating system or operating system component. In response scanner 214 may perform a full analysis of the bindings and linking required by the new version. Scanner 214 may then submit a usage profile for the proposed change that indicates deviations from a previous version of the operating system.

Comparator 216 may then search history database 208 to identify the various components and application programs that rely on an ABI interface that has changed. Comparator 216 may indicate the effect of the proposed change by providing a list of the components and application programs that are affected. Other formats of this information may also be provided. For example, comparator 216 may simply indicate a count of affected components for each change in the ABI. This information is then passed to emitter 218 and processing may flow to stage 304.

In stage 304, certification module 204 may certify a component or application program is compatible with the proposed change. In particular, emitter 218 may analyze the information provided from comparator 216 and search certification database 210. Emitter 218 may then determine which components or application programs have not been affected by the proposed change. Certification module 204 may certify these components and application programs without further testing. Conversely, emitter 218 may also determine those components and application programs that are significantly affected by the proposed change. Certification module 204 may issue a notice that the propose change voids the certification of the affected components to the vendor of that component. In response, the vendor may perform development or conduct other testing based on the notice issued by certification module 204.

Figure 4:
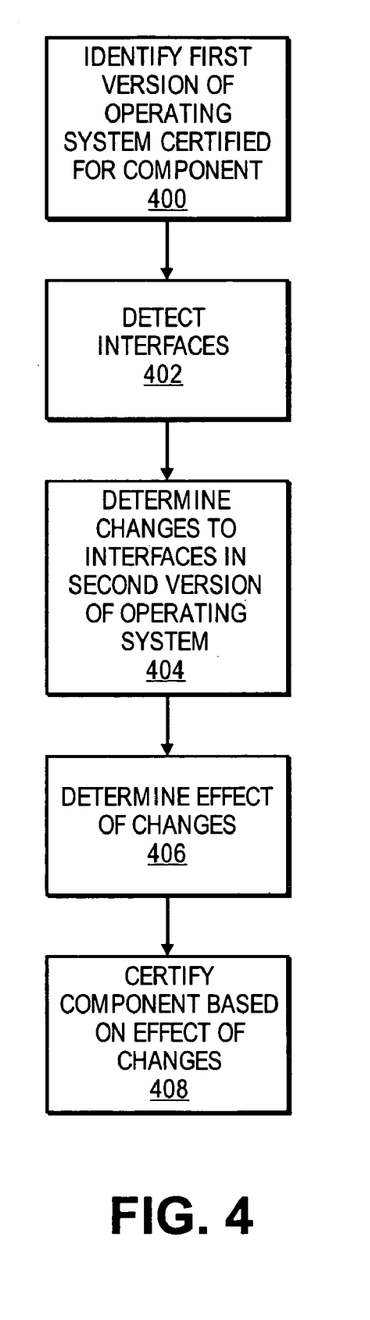
FIG. 4 illustrates a general process flow for certifying a component in response to one or more interface changes, in accordance with embodiments of the present invention.

FIG. 4 illustrates a general process flow for certifying a component in response to one or more interface changes, in accordance with embodiments of the present invention. At stage 400, a first version of an operating system (OS) certified for a component is identified. At stage 402, interface usage of the component is detected. In one embodiment, the detection is performed in the same manner as stage 300 of FIG. 3, as described above.

In stage 404, changes to interfaces in a second version of the OS are determined. In one embodiment, the changes are determined by certification service 108, as in stage 302 of FIG. 3. In another embodiment, certification module 204 and scanner 214 may determine the changes, as described in detail above for stage 302.

In stage 406, the effect(s) of changes are determined, as described above in stage 302. In stage 408, the component is certified based on the effect(s) of the changes. In one embodiment, the certification is performed by certification module 304, as described in detail above for stage 304.

Figure 5:
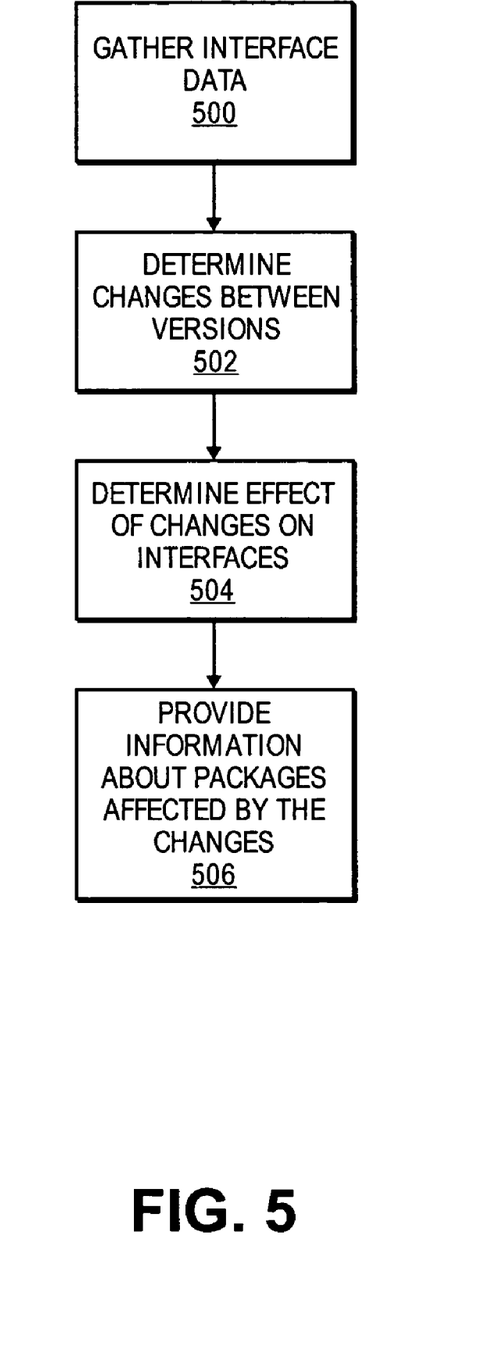
FIG. 5 illustrates a general process flow for providing information about one or more interface changes, in accordance with embodiments of the present invention.

FIG. 5 illustrates a general process flow for providing information about one or more interface changes, in accordance with embodiments of the present invention. In stage 500, interface data is gathered; in one embodiment, the data is gathered in a manner similar to the detection performed at stage 300 of FIG. 3, as described above.

In stage 502, changes between versions are determined. In one embodiment, the changes are determined in a manner similar to stages 302 and 404 above. In stage 504, the effect(s) of changes on interfaces are determined, as described above for stages 302 and 406. In stage 506, information about packages affected by the changes is provided.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
identifying, by a processor, a set of application interfaces used by a set of software applications provided by a first authenticated user to operate with an operating system;
determining a change to the set of application interfaces resulting from a change to the operating system;
searching a history database to identify at least one software application of the set of software applications that is affected by the change to the set of application interfaces;
identifying a remainder of the set of software applications in the history database that is not affected by the change to the set of application interfaces;
certifying the remainder of the set of software applications as compatible with the change to the operating system; and
providing access to a list of the certified set of software applications to a second authenticated user based on access permissions in a profile of support associated with the second authenticated user.

2. The method of claim 1, wherein identifying the set of application interfaces used by the set of software applications comprises identifying the set of application interfaces used by the set of software applications at runtime.

3. The method of claim 1, wherein identifying the set of application interfaces used by the set of software applications comprises identifying the set of application interfaces used by the set of software applications at compile time.

4. The method of claim 1, wherein identifying the set of application interfaces used by the set of software applications comprises identifying a set of symbols used by the set of software applications.

5. The method of claim 1, wherein identifying the set of application interfaces used by the set of software applications comprises identifying interfaces of an application programming interface (API) used by the set of software applications.

6. The method of claim 1, wherein identifying the set of application interfaces used by the set of software applications comprises identifying interfaces of an application binary interface (ABI) used by the set of software applications.

7. A method comprising;
identifying, by a processor, a first version of an operating system that software components provided by a first authenticated user have been certified as compatible with;
identifying a set of application interfaces used by the software components to operate with the first version of the operating system;
determining changes to the set of application interfaces in response to an update to the operating system from the first version to a second version;
searching a history database to identify at least one of the software components whose compatibility with the second version of the operating system is affected by the changes to the set of application interfaces;
identifying a remainder of the software components in the history database whose compatibility with the second version of the operating system is not affected by the changes to the set of application interfaces;
certifying the remainder of the software components as compatible with the second version of the operating system; and
providing access to a list of the certified set of software components to a second authenticated user based on access permissions in a profile of support associated with the second authenticated user.

8. The method of claim 7, wherein identifying the set of application interfaces used by the software components to operate with the first version of the operating system comprises identifying a set of symbols used by the first version of the operating system that indicate an offset in a library file of the operating system.

9. The method of claim 7, wherein identifying the set of application interfaces used by the software components to operate with the first version of the operating system comprises identifying interfaces of an application programming interface (API) of the operating system.

10. The method of claim 7, wherein identifying the set of application interfaces used by the software components to operate with the first version of the operating system comprises identifying interfaces of an application binary interface (ABI) of the operating system.

11. A system configured to collect information about application interfaces used by software applications to operate with an operating system, said system comprising:
 a set of application interfaces used by the software applications provided by a first authenticated user to operate with the operating system; and
 a processor configured to determine a change to the set of application interfaces resulting from a change to the operating system, search a history database to identify at least one of the software applications whose compatibility with the change to the operating system is affected by the change to the set of application interfaces, identify a remainder of the software applications in the history database whose compatibility with the change to the operating system is not affected by the change to the set of application interfaces and certify the remainder of the software applications as compatible with the change to the operating system, and providing access to a list of the certified set of software applications to a second authenticated user based on access permissions in a profile of support associated with the second authenticated user.

12. The system of claim 11, wherein the processor is further configured to determine that a compatibility of the set of application interfaces with the at least one of the software applications will not be certified.

13. The system of claim 11, further comprising an interface module configured to provide information that indicates the change to the set of application interfaces resulting from the change to the operating system.

14. The system of claim 11, further comprising an archive module configured to identify information that indicates a history of usage by the software applications of the set of application interfaces.

15. The system of claim 11, wherein the set of application interfaces is a set of application program interfaces (APIs).

16. The system of claim 11, wherein the set of application interfaces is a set of application binary interfaces (ABIs).

* * * * *